March 20, 1934.   E. ANDERSON   1,951,388
MULTISPEED CLUTCH AND TRANSMISSION MECHANISM
Filed July 17, 1930   4 Sheets-Sheet 1

Fig. 1.

INVENTOR
Emil Anderson
BY
Marshall & Hawley.
ATTORNEYS

March 20, 1934. E. ANDERSON 1,951,388

MULTISPEED CLUTCH AND TRANSMISSION MECHANISM

Filed July 17, 1930 4 Sheets-Sheet 4

INVENTOR
Emil Anderson
BY
ATTORNEYS

Patented Mar. 20, 1934

1,951,388

UNITED STATES PATENT OFFICE 1,951,388

MULTISPEED CLUTCH AND TRANSMISSION MECHANISM

Emil Anderson, Briarcliff Manor, N. Y.

Application July 17, 1930, Serial No. 468,518

25 Claims. (Cl. 74—34)

This invention relates to multi-speed clutch and transmission mechanism particularly adapted for use in motor vehicles.

The principal difficulty encountered by novices in motor car operation resides in the gear shift mechanism.

At the present time there is a growing tendency of motor car manufacturers to use larger and more powerful engines. For this reason it is seldom necessary to shift from high speed to a lower speed of transmission and, furthermore, the necessity for a plurality of lower speeds is being eliminated.

This invention has for its salient object to simplify the transmission of power from an engine to a transmission shaft or other parts to be driven and provide a transmission so constructed and arranged that it will automatically respond to variations in torque on the driven shaft.

Another object of the invention is to provide multi-speed clutch and transmission mechanism so constructed and arranged that the drive can be automatically shifted from high to low speed and the engine can be used as a brake in descending a hill.

Another object of the invention is to provide multi-speed transmission mechanism so constructed and arranged that a vehicle equipped with such mechanism can coast free of the driving connections but will be automatically placed under control of the engine when the engine speed exceeds the rate of rolling of the vehicle or by acceleration of the engine.

Another object of the invention is to provide multi-speed clutch and transmission mechanism so constructed and arranged that the drive can be automatically changed from low to high speed by opening the throttle or accelerating the engine.

Another object of the invention is to provide mechanism of the character described, so constructed and arranged as to effectively prevent any backward rolling of the vehicle when the vehicle has been stopped ascending a hill.

Another object of the invention is to provide clutch and brake mechanism so constructed and arranged as to insure more effective braking action.

Another object of the invention is to provide multi-speed clutch mechanism so constructed and arranged that it can be used to replace the standard clutch mechanism and when so used will double the number of speed changes that can be obtained by the variable speed transmission.

Further objects of the invention will appear from the following specification taken in connection with the drawings, which form a part of this application, and in which.

The invention briefly described consists of motion transmitting mechanism for transmitting the motion of the crank shaft of an engine to the transmission shaft by which power is delivered to the driven parts of a motor vehicle, aeroplane, or any other mechanism to be driven. The motion transmitting mechanism consists of a clutch interposed between the crank shaft and the transmission shaft and a plurality of driving connections incorporated in the clutch and adapted to transmit the drive through the clutch at a plurality of speeds. Planetary gearing is utilized to transmit the drive and the connecting parts are so relatively constructed and arranged that when the torque load on the engine exceeds by a predetermined amount the torque developed by the engine, the driving connections will be automatically shifted from a high speed to a lower speed. Furthermore, when the engine is speeded up or the torque is decreased, the drive will automatically shift back to high speed. In the particular form of the invention illustrated, the high speed is obtained by direct drive and the lower speed by planetary gearing.

The driving connections are furthermore so constructed and arranged that the engine may be used for braking purposes to slow down the rate of travel of the vehicle. The driving connections and parts cooperating therewith are also constructed and arranged in such a manner as to automatically prevent the vehicle from rolling backward when, for instance, the vehicle is going up a hill and a stop has been necessitated.

The structure of the driving connections includes a plurality of clutch members adapted to coact simultaneously with the clutch member which is driven from the engine and also adapted to coact independently with the engine driven clutch member whereby, in the first instance, a direct drive can be maintained and, in the second instance, a drive at lower speed will be obtained.

Further details of the invention will appear from the following description.

Figure 1:
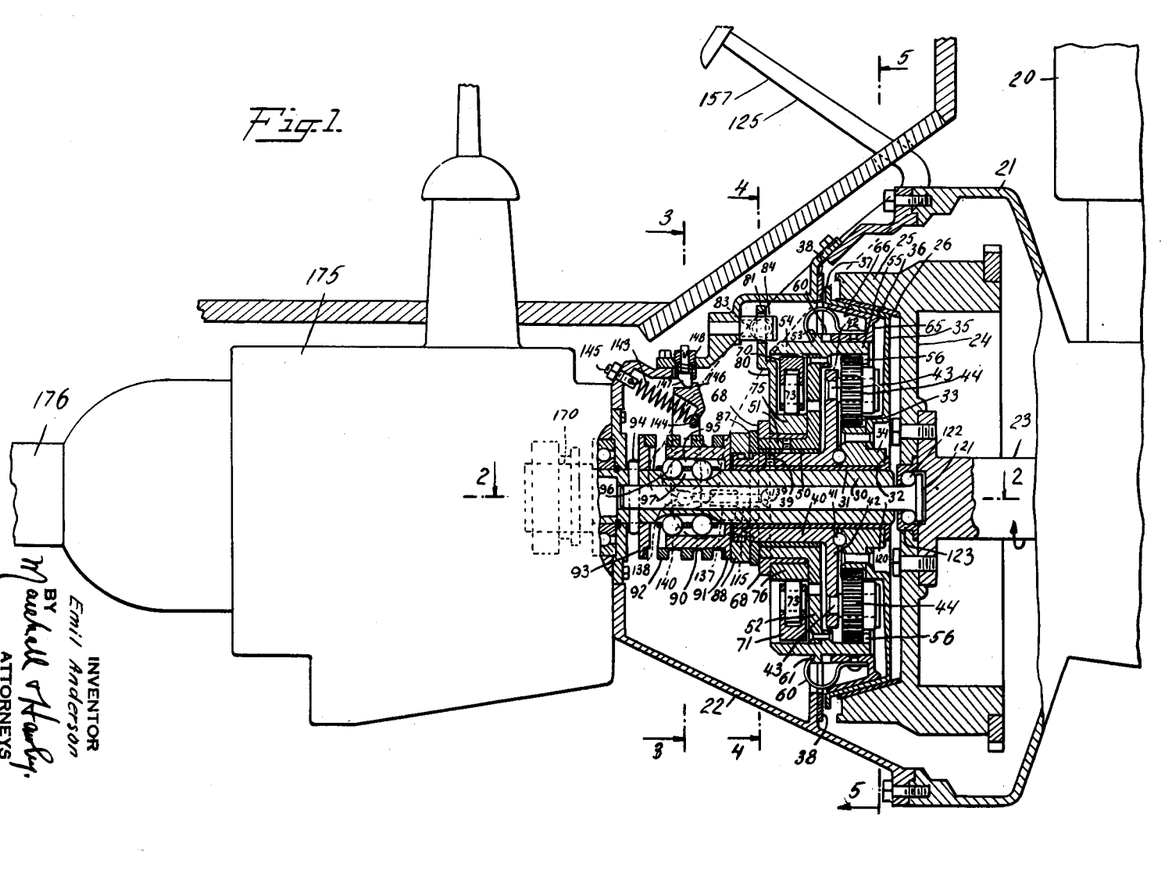
Fig. 1 is a sectional elevation of multi-speed clutch and transmission mechanism constructed in accordance with the invention.

In the particular embodiment of the invention illustrated in the drawings, there is shown in Fig. 1 a portion 20 of an internal combustion engine having a crank case 21 to which is secured a clutch casing 22 of the usual construction.

The engine shaft 23 has a fly wheel 24 secured thereto and the fly wheel has a flange 25 on the inner surface of which is formed a conical clutch member 26. A driven shaft 30 is axially alined with the crank shaft 23 and is disposed at the axis of rotation of the clutch member 26. The shaft 30 is hollow, as clearly illustrated in Figs. 1 and 2. A bushing 31 is rotatably mounted on the outer surface of the shaft 30 and has a flange 32 at the inner end thereof. A pinion or sun gear 33 is carried by a hub 34 rotatably mounted on the inner end portion of the outer surface of the bushing 31. The sun gear 33 has a disk 35 secured thereto and a flange 36 is formed on the outer periphery of the disk 35 and is adapted to engage the conical clutch surface of the clutch member 26. The flange 36 has formed on the outer end thereof, a laterally projecting flange 37 adapted under predetermined conditions hereinafter set forth to engage a friction surface 38 formed on the clutch casing 22.

A sleeve 40 is secured by a pin 39 to the bushing 31 and is separated from the hub 34 by ball thrust bearing 41. The sleeve 40 has formed thereon and extending laterally therefrom, a flange or disk 42 having studs 43 projecting laterally therefrom. Planet gears 44 are mounted on the studs 43 and mesh with the sun gear 33. A bushing 50 is mounted on the outer surface of the sleeve 40 and a sleeve 51 is secured to the bushing and has a laterally extending flange or disk 52 formed thereon. At the outer periphery of the disk there is secured a flange 53 which projects laterally from the disk in both directions, as shown at 54 and 55. The portion 55 of the flange has formed thereon an internal gear 56 which meshes with the planet gears 44.

The flange 53 has formed on the outer surface thereof, a plurality of annularly arranged cams 57 which normally engage corresponding cams 58 formed on a ring 59 which is slidably mounted on the outer surface of the flange 53. The cams 57 and 58 are normally held in engagement with each other by means of a plurality of springs 60 carried by the ring 59 and engaging a shoulder 61 on the flange 53.

The ring 59 has formed thereon a peripherally extending flange 65 on the outer edge of which is formed a clutch member 66 which is disposed within and is adapted to engage the clutch member 36 carried by the disk 35, which in turn is carried by the sun gear.

Figures 4, 5, 6, 7, 8, 9, 10:
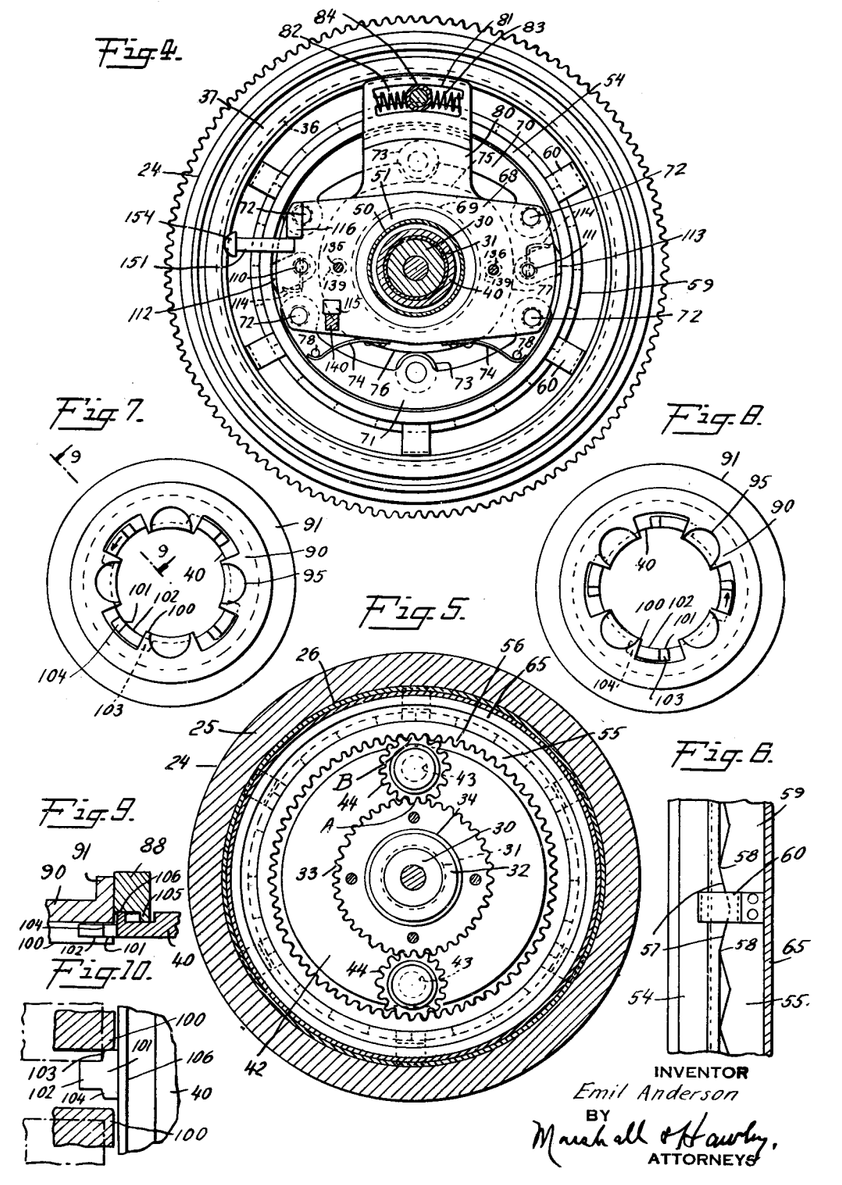
Fig. 6 is a detail plan view, partly in section, showing the coacting cams on the ring gear flange and ring gear clutch member.
Fig. 7 is an end elevation showing one position of engagement between the driving teeth and driven teeth of two coacting elements of the clutch mechanism.
Fig. 8 is a view similar to Fig. 7 but showing another position of driving engagement between the teeth.
Fig. 9 is a sectional elevation on an enlarged scale taken substantially on line 9—9 of Fig. 7.
Fig. 10 is a detail sectional elevation taken at right angles to Fig. 9.

A plate 68 is carried by a sleeve 69 rotatably mounted on the outer surface of the sleeve 51. The plate 68, as shown in Fig. 4, carries a pair of brake shoes 70 and 71, the shoes being mounted on studs 72 which project laterally from the plate. Sufficient clearance is provided between the brake shoes and the studs to permit a slight relative movement between the shoes and the studs.

Each brake shoe carries a roller 73, the rollers being disposed in engagement with cams 75 and 76 formed on a sleeve 77 mounted on the outer surface of the sleeve 69. The cams are adapted to press the brake shoes outwardly and springs 74 are carried by the plate 68 and engage studs 78 carried by the shoe 71. The springs normally hold the shoe 71 out of engagement with the flange 54. A plate 80 is secured to the sleeve 77 and is provided with an arcuate slot 81 having a pair of oppositely acting springs 82 and 83 therein. A stud 84, which is fixed and projects inwardly from the clutch casing 22, is disposed between the springs 82 and 83.

The sleeve 50 has formed on the outer end thereof a flange 87 against which bears a collar or split ring 88. A sleeve 90 surrounds the hollow shaft 30 and has a flange 91 engaging the outer surface of the split ring or collar 88. A spring 92 encircles the sleeve 90 and presses the flange 91 against the collar 88. The thrust at the opposite end of the spring is taken by a washer or ring 93 which abuts a pin 94, which in turn extends through the shaft 30.

The sleeve 90 constitutes the means by which the motion of rotation obtained by the drive through the clutch mechanism is transmitted to the hollow shaft 30. The inner surface of the sleeve 90 has formed therein a plurality of grooves 95 which receive balls 96. The balls are also seated in corresponding grooves 97 formed in the outer surface of the hollow shaft 30. By means of the balls in the oppositely facing grooves, the rotation of the member 90 is transmitted to the hollow shaft in the manner hereinafter described.

The sleeve 90 also has formed thereon a plurality of longitudinally extending teeth 100 adapted to coact with teeth 101 formed on the end of the sleeve 40. The teeth 101 have reduced extensions 102 and oppositely extending ledges 103 and 104 which are slightly inclined, as shown in Fig. 10. The split ring or collar 88 has an inwardly extending flange 105 adapted to coact with an outwardly extending flange 106 formed on the end of the sleeve 40 to limit the movement of the collar relative to the sleeve.

The plate 68 has pivoted thereon at diametrically opposite points 110 and 111, a pair of pawls 112 and 113 which are pressed by springs 114 into engagement with the inner surface of the flange 54.

The plate 68 and sleeve 69 are mounted for free rotation but a plurality of means are provided for holding the plate against rotation under certain conditions. In order to accomplish this the plate has laterally projecting therefrom, a pair of lugs 115 and 116 adapted to be engaged by coacting parts hereinafter described and when in engagement with the coacting parts to hold the plate against rotation.

In order to prevent the thrust of the spring 92 from being communicated to the engine shaft, a spindle 120 is mounted in the hollow shaft 30 and is engaged by the pin 94 which extends therethrough. The spindle has a head 121 at its opposite end, which is engaged by balls 122 mounted in a ball race 123 carried by the fly wheel 24.

Figures 2, 3:
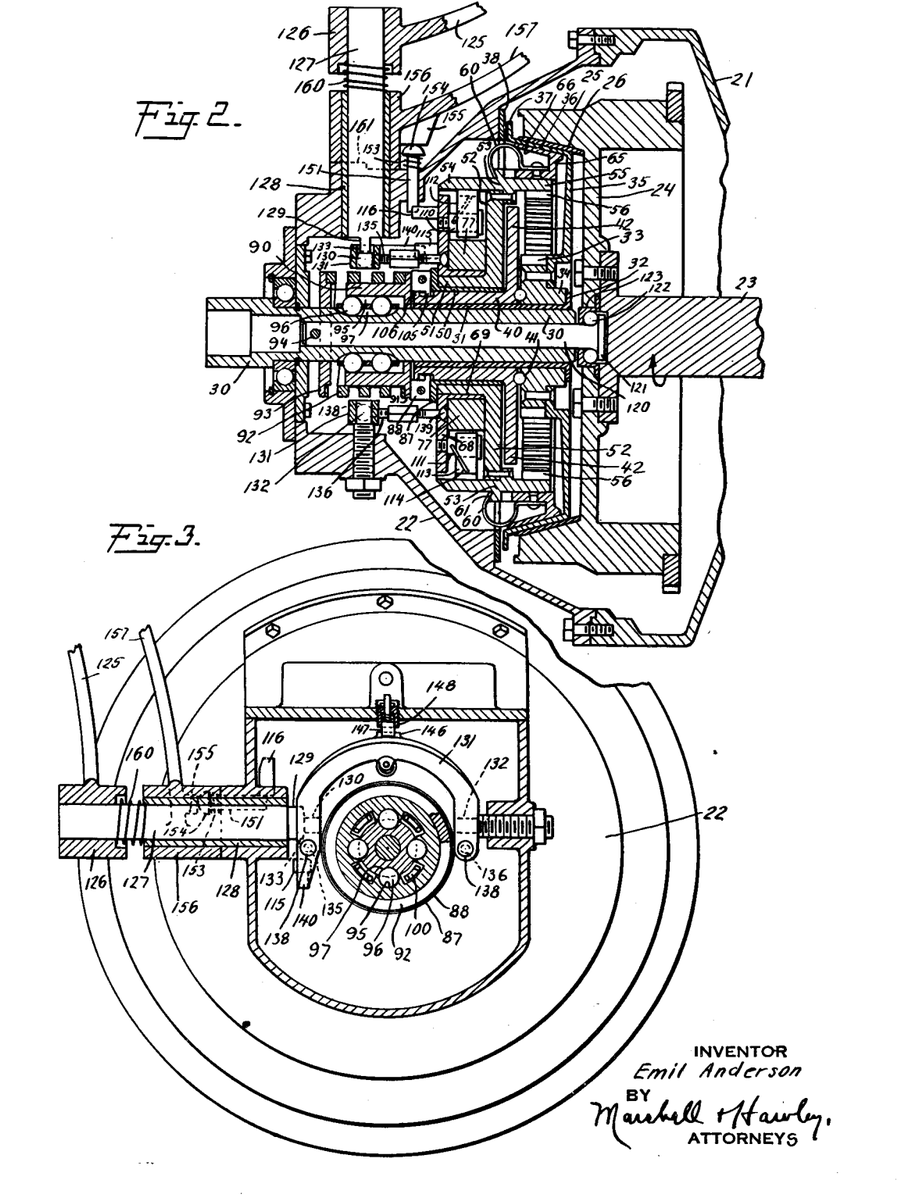
Fig. 2 is a sectional elevation taken at right angles to and substantially on line 2—2 of Fig. 1.
Figs. 3, 4 and 5 are detail sectional elevations taken substantially on lines 3—3, 4—4 and 5—5 of Fig. 1.

When the parts are in the position shown in Figs. 1 and 2, the spring 92 will force the flange 91 against the collar 88, which in turn will force the flange 87 and sleeve 51 to the right, carrying with them the flange 53 and disk 52. The coaction between the cams 57 and 58 and the action of the spring 60 will cause the clutch member 66 to press against the clutch member 36 carried by the disk 35 and this member will be forced against the clutch member 26 formed on the fly wheel. The drive will then be transmitted from the fly wheel through the three clutch members which rotate as a unit to the sleeve 51 and also to the sleeve 40 which rotates in unison with the sleeve 51. The engagement of the teeth 101 on the sleeve 40 with the teeth 100 on the sleeve 90 will transmit the drive to the sleeve 90. The balls 96 will then transmit the rotary motion of the sleeve 90 to the shaft 30.

When the torque or the driving effort increases beyond a predetermined amount with relation to the torque developed by the engine, the drag will be transmitted through the driving connections above described to the flange 53 which carries the ring gear. This will cause the cam teeth 57 to ride up on the teeth 58, which in turn will cause a thrust of the clutch member 66 against the clutch member 36 and a thrust in the opposite direction of the flange 53, disk 52 and sleeve 51. The sleeve 51 will in turn push against the flange 87, which will push the collar 88 against the flange 91. As the flange 91 and the sleeve 90 are pushed to the left, viewing Fig. 1, the teeth 100 formed on the sleeve 90 will ride up on the ledges 103 of the teeth 101. When this takes place the ledges will take the thrust of the spring and will communicate this thrust through the sleeve 40 and ball thrust bearing 41 to the sun gear hub, by which it will be transmitted through the disk 35 to the clutch member 36. Since the thrust of the spring is now taken by the ledges 103, the thrust will not be communicated to the sleeve 51, the disk 52 and flange 53. The springs 60 will therefore pull the clutch member 66 free from the clutch member 36.

When the above operation is taking place tne ring gear 56 being freed from the clutch will tend to rotate in a reverse direction but will be prevented by the pawls 112 and 113. The tendency of the ring gear to rotate will cause a slight rotation of the plate 68 which carries the pawls and of the sleeve 69 which is connected to the plate. As the plate is rotated to a slight extent, the rollers 73 will ride up on the fixed or stationary cams 75, 76 and cause the brake shoes 70, 71 to be thrust outwardly into engagement with the portion 54 of the flange 53. Thus, the ring gear will be held against rotation.

The drive, after the foregoing operation has taken place, will be transmitted from the sun gear 33 to the planet gears 44 and since the ring gear 56 is held against rotation the planet gears will transmit the drive through the disk 42 and sleeve 40 at a reduced speed.

After the torque decreases or the engine speed has been increased, the teeth 100 will ride off the ledges 103 and the spring 92 will then force the flange 91 to the right, viewing Fig. 1. When this takes place the sleeve 51, disk 52 and flange 53 will be forced to the right and the clutch member 66 will be again forced into driving engagement with the clutch members 36 and 26.

*Clutch and brake control mechanism*

The clutch is controlled by a clutch pedal 125 of the usual construction carried by a hub 126 secured to a shaft 127. The shaft 127 is journaled in a bushing 128 carried by the casing of the clutch mechanism. The end portion of the shaft 127 is flattened, as shown at 129, and a reduced portion 130 extends beyond the flattened portion and forms one pivot for the clutch yoke 131. The yoke is mounted at its opposite side on a pivot pin 132. The flattened portion 129 of the shaft engages in a recess or slot 133 of corresponding shape formed in the clutch yoke. The yoke 131 is connected by a pair of links 135 and 136 to the plate 68. The links are longitudinally adjustable by turnbuckles 137 and are connected to the yoke by ball joints 138. They are also connected to the flange by spherical or swivel joints 139. The yoke is provided with an extension or dog 140 which is disposed in the path of movement of the lug 115 carried by the plate 68. The dog 140, therefore, prevents rotation of this plate in the direction of rotation of the fly wheel when the clutch yoke is in normal position, as shown in Fig. 1. The yoke is held in the position shown in Fig. 1 by a spring 143 which is connected to the yoke at 144 and is adjustably connected to the casing 22 at 145. A tooth 146 is formed on the yoke and engages a spring pressed pawl or stop 147 slidably mounted in a plug 148 carried by the casing 22.

In addition to the lug 115 the plate 68 has also projecting therefrom the lug 116 which is adapted to be engaged by a pin 151 slidably mounted in the casing 22 and normally pressed outwardly by a spring 153. A head 154 is formed on the outer end of the pin 151 and is adapted for engagement by a cam 155 formed on the hub 156 of a brake pedal 157.

In order to permit rotation of the plate 68 in the direction of rotation of the fly wheel it is necessary to depress the clutch pedal 125 and withdraw the dog 140 from engagement with the lug 115 on the plate and also to depress the brake pedal 157 and permit the spring 153 to withdraw the pin 151 from the path of movement of the lug 116. When the brake pedal is depressed the cam 155 will permit the head 154 of the pin to move outwardly under the action of a spring 153.

The hub 156 of the brake pedal is rotatably mounted on a bushing on the shaft 127 and is also slidably mounted thereon. A spring 160 presses against the outer end of the hub and forces the hub against the casing 22. The end of the hub against the casing is offset, as shown at 161, the casing 22 also being offset. The offset portions of the casing and hub form a stop for limiting the movement of the hub and brake pedal in one direction.

The object of slidably mounting the hub is to permit the hub to move outwardly in case the brake pedal is returned to its normal inoperative position and the lug 150 is positioned opposite the pin 151. Under these circumstances the hub will slide outwardly to permit the brake pedal to return to its normal position.

The brake pedal 157 will be connected in the usual manner to operate the vehicle brakes but since the connections to the brakes form no part of the invention claimed in this case, it has been deemed unnecessary to illustrate such old and common operative connections.

The multi-speed transmission connections or clutch mechanism above described may be substituted for the usual clutch and variable speed transmission mechanism or, if desired, may be used to supplement the usual variable speed transmission. In Fig. 1 the shaft 30 is shown as extending through the end of the clutch casing 22 and as connected to a shaft 170. The shaft 170 may be connected through the usual variable speed transmission gearing to drive the transmission shaft 176.

It will be obvious that if the multi-speed clutch mechanism described is coupled to the ordinary variable speed transmission, that twice the number of speeds now obtained by the variable speed transmission can be secured. This is true since a slow speed drive and direct drive may be obtained by the multi-speed clutch mechanism and either of these drives may be connected through the first, second or high speed driving connections to the transmission shaft.

Figure 11:
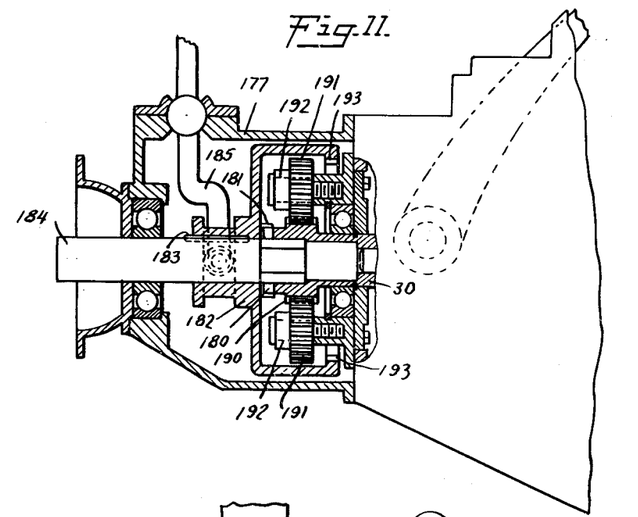
Fig. 11 is a sectional elevation showing reverse gearing connected to the multi-speed clutch mechanism.

In Fig. 11 the multi-speed clutch mechanism is shown as connected to a housing 177 having therein gearing by means of which a reverse drive may be secured. In this figure the driven shaft 30 has formed on the end thereof, clutch teeth 180 which are adapted to mesh with complementary clutch teeth 181 carried by a hub 182 which is splined, as shown at 183, to the transmission shaft 184. The hub 182 is engaged by a gear shift lever 185. The shaft 30 has formed thereon or connected thereto, a sun gear 190 which meshes with planet gears 191 mounted on stationary shaft 192 and adapted to mesh with a ring gear 193 which is carried by the hub 182.

When the parts are in the position shown in Fig. 11, the driven shaft 30 is directly connected to the transmission shaft 184 by the engagement of the complementary clutch members 180 and 181. In order to obtain a reverse drive the lever 185 is pushed forwardly, causing the clutch members 180 and 181 to move out of operative relation and causing the ring gear 193 to mesh with the idler planet gears 191. The rotation of the shaft 30 will then cause the ring gear to rotate in a reverse direction and will, therefore, drive the shaft 184 in a reverse direction.

Figure 12:
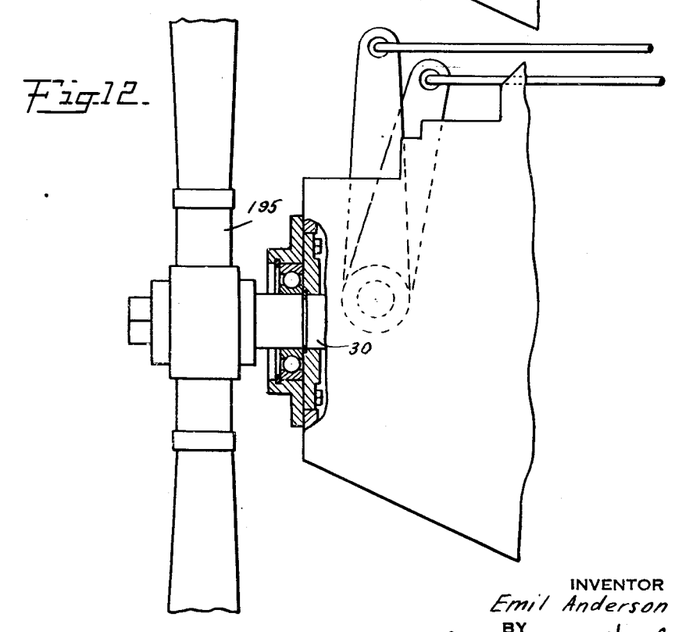
Fig. 12 is an elevational view, partly in section, showing the multi-speed clutch mechanism connected to a propeller.

Fig. 12 illustrates the multi-speed clutch mechanism shaft 30 as having a propeller 195 mounted on the end thereof. By varying the speed of rotation of the shaft 30, two different speeds of rotation of the propeller may be obtained. As is well known, the air resistance offered to the rotation of a propeller at high altitudes is very much less than that offered at low altitudes. Thus, with the mechanism described, the rate of rotation of the propeller can be speeded up at high altitudes, increasing the efficiency of operation of the propeller.

Operation

The operation of the multi-speed clutch mechanism when installed in a motor vehicle will now be outlined. The engine is started in the usual manner with the gear shift lever in neutral provided the variable speed transmission is utilized or with the clutch pedal depressed if the multi-speed clutch mechanism only is used to transmit the drive from the engine to the transmission shaft. The gear shift lever is then moved to throw the car "in gear" either in first or second speed if the usual transmission mechanism is used with the multi-speed clutch. Pressure on the clutch pedal is then released and the drive will be transmitted to the variable speed transmission mechanism or to the transmission shaft at slow speed. The slow speed drive through the multi-speed clutch mechanism will be obtained due to the heavy torque required to start the car. When a heavy torque is placed on the clutch mechanism, the resistance of the driven shaft 30 to rotation will be transmitted through the sleeve 90 and clutch teeth 100, 101 to the sleeve 40 and disk 42 on which the planet gears 44 are mounted. Thus, the planet gears tend to resist rotation between the sun gear 33 and the ring gear 56. This resistance will take place at points A and B or at the points of intermeshing of the planet gears with the sun gear and ring gear. The resistance at B compels the ring gear 56 to slow down. When this takes place, the cam teeth 57 will ride upon the cam teeth 58 and if the torque resistance is sufficient, the ring gear, disk 52 and sleeve 51 will be pushed to the left, viewing Figs. 1 and 2. This pressure will be transmitted through the intermediate parts to the flange 91 and the teeth 100 carried by the sleeve 90 will be moved relative to the teeth 101 a sufficient distance to cause the teeth 100 to engage the ledge 103 on the teeth 101. When the teeth 100 rest on the ledge 103, the pressure of the spring 92 will be taken by the sleeve 40 which carries the planet gears 44. Since the spring pressure is no longer exerted on the sleeve 51 and ring gear flange 53, the springs 60 will cause the clutch member 66 to withdraw from engagement with the intermediate clutch member 36.

When the above operations are taking place the flange 87 will be forced to the left, viewing Figs. 1 and 2, engaging the dog 140 on the clutch yoke and forcing the dog to the left and the yoke 131 about its pivot in a direction to stretch the spring 143. By adjusting the tension on the spring 143, the shifting of the drive from high speed to low speed can be controlled.

Also, the flexible connections or springs 60 between the ring gear and the ring gear clutch permit the cams 57 and 58 to ride up on each other to a limited extent and to return to their initial positions without shifting the driving connections.

When it is desired to shift the low speed a slight depression of the clutch pedal will remove the dog 140 from the path of movement of the flange 87 and will facilitate the shift.

The sun gear will be driven by the clutch member 36 and the internal gear 56 would normally tend to rotate in a reverse direction. This, however, is prevented by the pawls 112 and 113 carried by the plate 68. This plate, due to the tendency of the ring gear to rotate in a reverse direction, will be swung on its axis to a sufficient extent to cause the rollers 73 of the brake shoes 70 and 71 to ride up on the cams 75 and 76 and the brake shoes will be forced into engagement with the flange 54, thus preventing the rotation of the ring gear. The spring 83 will act as a damper or cushion during this operation.

Since the ring gear is now held against rotation, the drive will be transmitted from the sun gear 33 through the planet gears 44 and the shaft 30 will be driven at a reduced speed.

The relative positions of the teeth 100 and 101 are shown in Figs. 7 and 9. When the torque resistance to the driving vehicle has decreased, or the engine speed has been increased by accelerating the engine, the teeth 100 will slide off the ledges 103 to the position shown in Fig. 10 and the pressure of the spring 92 will be again directed through the intermediate parts to the ring gear clutch member and the vehicle will be again driven at direct or high speed.

When the clutch member 36 is released from the fly wheel clutch member 26 by depressing the clutch pedal 125, the pull on the plate 68 will through flange 87 be communicated to flange 87 and ring 88. The flange 105 on 88 will then engage flange 106 on sleeve 40 and the sleeve 40 and bushing 31 will be moved to the left. The flange 32 on the end of the bushing will force the sun gear hub 34, disk 35 and clutch member 36 to the left, disconnecting the clutch member 36 from the fly wheel clutch member 26.

Braking operation

As is well known, in the operation of motor vehicles it is often desirable, if not necessary, to use the engine or motor as a brake when descending steep hills. In order to do this the usual custom is to shift gears from high into second or even into low. This is a difficult operation and it is sometimes necessary to stop the car before the gears can be shifted.

With the multi-speed clutch mechanism above described, the operation is simple and can be carried out in the following manner. Assuming that the motor is connected to the wheels through the direct drive or high speed driving connections, in order to shift to the low speed driving connections in the multi-speed clutch, pressure is exerted on both the clutch and brake pedals.

When the motor is driving, the plate 68 tends to rotate with the clutch and ring gear since the clutch casing is partially filled with oil or lubricant. The rotation of the plate 68 is, however, prevented under normal conditions by the engagement of the dog 140 carried by the clutch yoke with the lug 115 and by the engagement of the pin 151 with the lug 116. When the clutch pedal and brake pedal are depressed, the lugs 115 and 116 will be released and the plate 68 will tend to rotate. When this takes place the brake shoes 70 and 71 will be forced outwardly by the stationary cams 75 and 76 and the further rotation of the plate will be arrested. Furthermore, the brake shoes will grip the inside of the flange 54 and prevent the ring gear from rotating. Since the ring gear is held from rotation, the cams 57 and 58 will, in the manner hereinbefore described, cause the spring 92 to be compressed and cause the teeth 100 to ride on the ledges 104 of the teeth 101. This driving position of the teeth 100 and 101 is illustrated in Fig. 8. The drive will then be transmitted through the low gear and since the vehicle and transmission shaft are rotating at a faster rate of speed than the rate of rotation of the engine, the wheels of the vehicle will be connected to the engine through a low speed gearing connection.

A braking action can also be obtained by depressing the clutch pedal substantially all the way in addition to depressing the brake pedal at the same time. This will cause the flange 37 on the clutch member 36 carried by the sun gear to press against the stationary friction surface 38, tending to prevent further rotation of the sun gear. Under these conditions the clutch will be thrown out since the clutch surface 36 will be disposed out of contact with the clutch surface 26 on the fly wheel. The internal gear will be at this time held against rotation by the engagement of the flange 37 with the friction surface 38. It will therefore be evident that the planet gears can rotate only in case of a slip between the flange 37 and the friction surface 38.

It is sometimes considered desirable for the operator of a vehicle to permit the vehicle to coast or to roll under its own momentum as, for instance, in descending a hill. This can be done with the ordinary transmission by throwing out the clutch or by shifting the gear shift lever to neutral. In either case, however, the vehicle is disconnected from the engine and is out of control, which is not safe nor desirable.

With the multi-speed clutch mechanism hereinbefore described, this can be accomplished without disconnecting the engine from the wheels and in such a manner that a slight pressure on the accelerator is all that is necessary to permit the engine to again control the movement of the vehicle. For instance, when the vehicle is rolling forward or descending a hill and the engine is running at a slow rate of speed or is retarded, the clutch pedal is temporarily depressed, thus compressing the spring 92. When this is done the teeth 100 will ride up on the ledges 104 of the teeth 101. The ring gear clutch will then be released and pressure on the clutch pedal can be discontinued. The internal gear will now rotate at a forward speed faster than the engine speed and can rotate freely.

In order to again drive the car it will be necessary merely to accelerate the engine to a sufficient extent to cause the engine to operate at a faster rate of speed than the rate of rolling of the vehicle. The teeth 100 will then ride off the ledges 104 and the car will again operate at high speed or on direct drive.

The multi-speed clutch mechanism hereinbefore described also possesses a further advantage in that the vehicle will be effectively held against backing down a hill when it has been necessary to stop the vehicle in ascending a hill. Assuming that the vehicle is climbing a hill at low speed and it is necessary to stop, the clutch pedal will be depressed to its limit of movement, thus disengaging the sun gear clutch from the fly wheel clutch and making frictional contact with the friction surface 38. The ring gear will be held against rotation in a backward direction by means of the pawls 112 and 113 and since the ring gear and sun gear are both held, the planet gears will be also held against rotation. It is probable that the brake pedal will also be depressed but the interlocking of the sun gear, ring gear and planet gears will prevent the car from rolling backward.

From the foregoing description it will be clear that the multi-speed clutch mechanism possesses many distinct advantages over the variable speed driving mechanisms now in use. The drive will automatically shift from high to low when the torque requirements necessitate such a change in speed and will again automatically return to high speed when the conditions or requirements have been relieved. Furthermore, when the vehicle is descending a hill, the engine can be used as a brake by depressing both pedals, the clutch and brake, and causing the drive to be shifted from high to low. Also, as above pointed out, the vehicle can be permitted to coast when the engine is slowed down and the car is rolling at a faster rate of speed than the rate of rotation of the engine by the simple temporary depression of the clutch pedal. This depression of the clutch pedal will automatically cause the drive to be shifted from high to low and since the ring gear is not locked it can rotate freely in a forward direction at a higher rate of speed than the rate of rotation of the engine. To again put the vehicle under control of the engine it is merely necessary to accelerate the engine so that it will operate at a higher rate of speed than the rate of rolling of the vehicle. In addition to these advantages and functions, the multi-speed clutch mechanism will effectively prevent any backward rolling of the car when the car is on an incline and has been stopped.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a drive shaft, a driven shaft and clutch mechanism intermediate said shafts, said clutch mechanism including variable speed driving connections, manually operable clutch control means, and means set in operation by the momentary actuation of said clutch control means and release of said clutch control means to its initial normal position for shifting from high speed driving connections to lower speed driving connections.

2. In combination, a drive shaft, a driven shaft and clutch mechanism intermediate said shafts, said clutch mechanism including variable speed driving connections, manually operable clutch control means, and means set in operation by the momentary actuation of said clutch control means and release of said clutch control means to its initial normal position for shifting from one set of driving connections to another set of driving connections.

3. In combination, a drive shaft, a driven shaft and clutch mechanism intermediate said shafts, said clutch mechanism including variable speed driving connections and a plurality of clutch connections, manually operable clutch control means, and means set in operation by the momentary actuation of said clutch control means and release of said clutch control means to its initial normal position for shifting from one clutch connection and set of driving connections to another clutch connection and set of driving connections.

4. In combination, a drive shaft, a driven shaft and clutch mechanism intermediate said shafts, said clutch mechanism including variable speed driving connections and a plurality of clutch connections, manually operable clutch control means, and means set in operation by the momentary actuation of said clutch control means and release of said clutch control means to its initial normal position for shifting from one clutch connection and a high speed driving connection to another clutch mechanism and a lower speed driving connection.

5. In combination, a drive shaft, a clutch member connected thereto, a driven shaft, a sun gear having a clutch member adapted for engagement with said first clutch member, a ring gear having a clutch member adapted for engagement with the sun gear clutch member, a spring for holding said sun gear and ring gear clutch members in operative position, planet gears meshing with said sun and ring gears, a carrier for said planet gears, operative connections between said planet gear carrier and said driven shaft, and means responsive to a predetermined torque limit on the driven shaft for compressing the spring and moving the ring gear clutch member out of operative engagement with the sun gear clutch member.

6. In combination, a drive shaft, a driven shaft, operative connections between said shafts including clutch mechanism and high and low speed driving connections, clutch control means, brake operating means independent of said clutch control means, and means set in operation by the actuation of both said clutch control means and said brake operating means for automatically shifting from the high speed to the low speed driving connections.

7. In combination, a drive shaft, a driven shaft, a clutch member connected to the drive shaft, a clutch member adapted to engage with said first clutch member, operative driving connections between said second clutch member and the driven shaft, means for disconnecting said second clutch member from the first clutch member, and automatically operating means for holding the clutch members out of coactive relation with respect to each other, said operative driving connections including means so constructed that the driven shaft can rotate faster than the drive shaft and free of said shaft.

8. In combination, a drive shaft, a driven shaft, a clutch member connected to the drive shaft, a clutch member adapted to engage with said first clutch member, operative driving connections between said second clutch member and the driven shaft, means for disconnecting said second clutch member from the first clutch member, and means operative only when the driven shaft is rotating faster than the drive shaft for holding the clutch members out of coactive relation with respect to each other, said operative driving connections including means so constructed that the driven shaft can rotate faster than the drive shaft and free of said shaft.

9. In combination, a drive shaft, a driven shaft, a clutch member connected to the drive shaft, a clutch member adapted to engage with said first clutch member, operative driving connections between said second clutch member and the driven shaft, and automatically operating means for holding the clutch members out of coactive relation with respect to each other, said operative driving connections including means so constructed that the driven shaft can rotate faster than the drive shaft and free of said shaft.

10. In combination, a drive shaft, a driven shaft, a clutch member connected to the drive shaft, a clutch member adapted to engage with said first clutch member, operative driving connections between said second clutch member and the driven shaft, and means operative only when the driven shaft is rotating faster than the drive shaft for holding the clutch members out of coactive relation with respect to each other, said operative driving connections including means so constructed that the driven shaft can rotate faster than the drive shaft and free of said shaft.

11. In combination, a drive shaft, a driven shaft, operative driving connections between said shafts, and means for disconnecting and holding inoperative said driving connections, said holding means being rendered automatically inoperative when the drive shaft is rotated faster than the driven shaft.

12. In combination, a drive shaft, a driven shaft, operative driving connections between said shafts, and means for disconnecting and holding inoperative said driving connections, said holding means being operative when the driven shaft is rotating faster than the drive shaft and being rendered automatically inoperative when the drive shaft is rotated faster than the driven shaft.

13. In combination, a drive shaft, a driven shaft, operative driving connections including clutch mechanism between said shafts, and means for disconnecting said clutch mechanism and holding inoperative said driving connections, said holding means being rendered automatically inoperative when the drive shaft is rotated faster than the driven shaft.

14. In combination, a drive shaft, a driven shaft, a pair of operatively connected power transmitting members movable axially relative to each other, one of said members being connected to the driven shaft, mechanism intermediate said other member and the drive shaft for transmitting power at a plurality of speeds, and means responsive to variations in the torque on the driven shaft for automatically moving said members axially relative to each other and shifting said mechanism from one speed to another speed in accordance with the torque requirements of the driven shaft.

15. In combination, a drive shaft, a driven shaft, a pair of operatively connected power transmitting members, one of said members being connected to the driven shaft, means including clutch mechanism for connecting said second member to said drive shaft, reduction gearing for connecting said second member to said drive shaft, and means on said power transmitting members for holding said clutch mechanism disconnected.

16. In combination, a drive shaft, a driven shaft, a pair of operatively connected power transmitting members, one of said members being connected to the driven shaft, means including clutch mechanism for connecting said second member to said drive shaft, reduction gearing for connecting said second member to said drive shaft, means on said power transmitting members for holding said clutch mechanism disconnected, and means responsive to torque requirements on the driven shaft for shifting the drive to the reduction gearing.

17. In combination, a drive shaft, a driven shaft, a pair of power transmitting members between said shafts, operative driving means intermediate one of said members and the drive shaft for driving said member at the speed of rotation of the drive shaft, driving connections between said member and the drive shaft for driving the member at a reduced speed, and coacting means between said power transmitting members for holding said operative driving means inoperative.

18. In combination, a drive shaft, a driven shaft, a pair of power transmitting members between said shafts, operative driving means intermediate one of said members and the drive shaft for driving said member at the speed of rotation of the drive shaft, driving connections between said member and the drive shaft for driving the member at a reduced speed, coacting means between said power transmitting members for holding said operative driving means inoperative, and means controlled by the torque on the driven shaft for operating said reduced speed driving connections.

19. In combination, a drive shaft, a driven shaft, a pair of drive transmitting members, said members being relatively movable and arranged to transmit the drive in a plurality of relative positions, one of the members being connected to the driven shaft, means intermediate the other member and the drive shaft for driving said member at a plurality of speeds, said member being driven at one speed when said drive transmitting members are disposed in one position relative to each other and at another speed when said members are disposed in another position relative to each other.

20. In combination, a drive shaft, a driven shaft, a pair of drive transmitting members, said members being relatively movable and arranged to transmit the drive in a plurality of relative positions, one of the members being connected to the driven shaft, means intermediate the other member and the drive shaft for driving said member at a plurality of speeds, said member being driven at one speed when said drive transmitting members are disposed in one position relative to each other and at another speed when said members are disposed in another position relative to each other, and torque controlled means for operating the shift from a higher speed to lower speed.

21. In combination, a drive shaft, a driven shaft, a pair of drive transmitting members, one of said members being connected to the driven shaft, coacting means on said members for transmitting the drive from one member to the other, planetary gearing including a ring gear, a clutch member driven by said drive shaft, a clutch member on said ring gear adapted to be driven by said first named clutch member, planet gears carried by the other of said power transmitting members, a sun gear having a clutch member movable into driving relation to said first named clutch member, means controlled by the torque on the driven shaft for disconnecting the ring gear clutch from the drive shaft, and means for holding the ring gear stationary.

22. In combination, a drive shaft, a driven shaft, operative driving connections between said shafts, and means including a manually controllable member for disconnecting and holding inoperative said driving connections, said holding means being rendered automatically inoperative when the drive shaft is rotated faster than the driven shaft.

23. In combination, a drive shaft, a driven shaft, a clutch member connected to the drive shaft, a clutch member adapted to engage with said first clutch member, operative driving connections between said second clutch member and the driven shaft, means for disconnecting said second clutch member from the first clutch member, and manually controllable means operative only when the driven shaft is rotating faster than the drive shaft for holding the clutch members out of coactive relation with respect to each other, said operative driving connections including means so constructed that the driven shaft can rotate faster than the drive shaft and free of said shaft.

24. In combination, a drive shaft, a driven shaft, operative driving connections between said shafts, and means including a manually operable member for disconnecting and holding inoperative said driving connections, said holding means being operative when the driven shaft is rotating faster than the drive shaft and being rendered automatically inoperative when the drive shaft is rotated faster than the driven shaft.

25. In combination, a drive shaft, a driven shaft, a pair of operatively connected power transmitting members, one of said members being connected to the driven shaft, means including clutch mechanism for connecting said second member to said drive shaft, reduction gearing for connecting said second member to said drive shaft, a clutch control member, and means on said power thansmitting members and controllable by said clutch control member for holding said clutch mechanism disconnected.

EMIL ANDERSON.